US012741810B2

(12) United States Patent
Shen

(10) Patent No.: US 12,741,810 B2
(45) Date of Patent: Sep. 22, 2026

(54) METHOD AND DEVICE FOR STORING CONTAINER IN WAREHOUSE

(71) Applicant: Beijing Jingdong Zhenshi Information Technology Co., Ltd., Beijing (CN)

(72) Inventor: Jingnan Shen, Beijing (CN)

(73) Assignee: Beijing Jingdong Zhenshi Information Technology Co., Ltd., Beijing (CN)

(*) Notice: Subject to any disclaimer, the term of this patent is extended or adjusted under 35 U.S.C. 154(b) by 433 days.

(21) Appl. No.: 18/553,079

(22) PCT Filed: Apr. 6, 2022

(86) PCT No.: PCT/CN2022/085277
§ 371 (c)(1),
(2) Date: Sep. 28, 2023

(87) PCT Pub. No.: WO2022/213972
PCT Pub. Date: Oct. 13, 2022

(65) Prior Publication Data

US 2024/0174438 A1 May 30, 2024

(30) Foreign Application Priority Data

Apr. 6, 2021 (CN) ........................ 202110366021.5

(51) Int. Cl.
*B65G 1/04* (2006.01)
*B65G 1/137* (2006.01)
(Continued)

(52) U.S. Cl.
CPC ............... *B65G 1/04* (2013.01); *B65G 1/137* (2013.01); *G06Q 10/08* (2013.01); *G06Q 10/087* (2013.01)

(58) Field of Classification Search
CPC .......... B65G 1/04; B65G 1/137; G06Q 10/08; G06Q 10/087
See application file for complete search history.

(56) References Cited

U.S. PATENT DOCUMENTS 10,351,346 B2 * 7/2019 Otto ...................... B66F 9/0755
2007/0017984 A1 * 1/2007 Mountz ............... G06Q 10/087
235/385

FOREIGN PATENT DOCUMENTS

CN 106934577 A * 7/2017 ............. G06Q 10/04
CN 106966100 A 7/2017
(Continued)

OTHER PUBLICATIONS

CN-106934577-A (Year: 2017).*
(Continued)

*Primary Examiner* — Ernesto A Suarez
*Assistant Examiner* — Laurence R Brothers
(74) *Attorney, Agent, or Firm* — Qinghong Xu

(57) ABSTRACT

A method and device for storing a container in a warehouse are provided. The method includes: determining ranking of a first click volume of a to-be-stored container in a first click volume of a stored container at a target streetlet, the first click volume being used for characterizing a retrieval frequency of a container; determining a matching degree between the to-be-stored container and an available rack of the target streetlet according to the ranking of the first click volume of the to-be-stored container in the first click volume of the stored container at the target streetlet; and determining a storing rack for the to-be-stored container from the available rack according to the matching degree between the to-be-stored container and the available rack.

18 Claims, 6 Drawing Sheets

(51) Int. Cl.

| | |
|---|---|
| ***G06Q 10/08*** | (2024.01) |
| ***G06Q 10/087*** | (2023.01) |
| *G06Q 30/0201* | (2023.01) |
| *G16Y 10/40* | (2020.01) |
| *G16Y 20/20* | (2020.01) |

(56) References Cited

FOREIGN PATENT DOCUMENTS

| | | | | | |
|---|---|---|---|---|---|
| CN | 109325716 A | * | 2/2019 | ........... G06Q 10/087 |
| CN | 109544054 A | * | 3/2019 | ........... G06Q 10/087 |
| CN | 109993470 A | | 7/2019 | |
| CN | 110059992 A | | 7/2019 | |
| CN | 110414879 A | * | 11/2019 | ....... G06Q 10/06312 |
| CN | 110723453 A | | 1/2020 | |
| CN | 111985860 A | | 11/2020 | |
| CN | 112215532 A | * | 1/2021 | ......... G06K 17/0029 |
| CN | 112455983 A | | 3/2021 | |
| CN | 113762880 A | | 12/2021 | |
| JP | 2001354309 A | | 12/2001 | |
| WO | 2017168678 A | | 10/2017 | |
| WO | 2017168678 A1 | | 10/2017 | |
| WO | 2018099134 A | | 6/2018 | |
| WO | 2018099134 A1 | | 6/2018 | |

OTHER PUBLICATIONS

CN-109325716-A (Year: 2019).*
CN-109544054-A (Year: 2019).*
CN-112215532-A (Year: 2021).*
CN-110414879-A (Year: 2017).*
2nd Office Action dated Nov. 8, 2023 for Chinese Application No. 202110366021.5.
Yajun Zhang et al., Accurate indoor localization with channel state information, ENSsys '15: Proceedings of the 3rd International Workshop on Energy Harvesting & Energy Neutral Sensing Systems, published on Nov. 30, 2015, p. 35-36.
Extended European Search Report dated Dec. 23, 2024 of European Application No. 22784038.6.
International Search Report dated Jun. 28, 2022 of International Application No. PCT/CN2022/085277.
1st Office Action dated Apr. 28, 2023 of Chinese Application No. 202110366021.5.
Jidong Fan, Study on Batch Picking Strategy of "Goods to Person" Picking System, published on Dec 25, 2019, p. 71-75.
Anjiang Cai et al., Industrial Production Warehouse Goods Allocation and Optimization, Machinery Design & Manufacture, published on Oct. 8, 2015, p. 264-267.
Notice of Allowance dated Jun. 14, 2024 of Chinese Application No. 202110366021.5.

* cited by examiner

METHOD AND DEVICE FOR STORING CONTAINER IN WAREHOUSE

This application is a U.S. national phase of International Application No. PCT/CN2022/085277 filed on Apr. 6, 2022, which claims priority to Chinese patent application No. 2021103660215, filed with the China National Intellectual Property Administration on Apr. 6, 2021, entitled "Method And Device For Storing Container In Warehouse", the entire contents of which are incorporated herein by reference.

TECHNICAL FIELD

The present disclosure relates to the technical field of the Internet of Things, and in particular, relates to a method and device for storing a container in a warehouse.

BACKGROUND

With the development of science and technology, the logistics industry is rapidly transforming from traditional logistics to modern logistics. An automated stereoscopic warehouse for storing commodity is an important part of the modern logistics. The automated stereoscopic warehouse usually includes a plurality of streetlets, each streetlet has a plurality of levels of racks for storing containers, and each container stores one or more commodities. A shuttle vehicle may move horizontally on the rack of a level of the streetlet to take a to-be-retrieved container from a storage location and carry the same to a retrieval buffering location at a streetlet exit on that level, and then a lifer takes the container from the retrieval buffering location and carries the same onto a conveyor line, and the conveyor line transmits the container to a picking workstation for retrieval picking and other operations.

In the related art, in the automated stereoscopic warehouse fully equipped with a plurality of shuttle vehicle, each rack level at each streetlet is provided with one shuttle vehicle which is responsible for the retrieval carrying of all the containers on that rack level of the streetlet. In order to reduce the investment cost of equipment, in some automated stereoscopic warehouses, it does not provide each rack level with one shuttle vehicle, but the shuttle vehicle transmits/changes between different rack levels through a lifter, so that one shuttle vehicle may carry the containers for storage at a plurality of rack levels.

SUMMARY

Embodiments of the present disclosure provide a method and device for storing a container in a warehouse to resolve.

In a first aspect, an embodiment of the present disclosure provides a method for storing a container in a warehouse, including:

- determining ranking of a first click volume of a to-be-stored container in a first click volume of a stored container at a target streetlet, the first click volume being configured to characterize a retrieval frequency of a container;
- determining a matching degree between the to-be-stored container and an available rack of the target streetlet according to the ranking of the first click volume of the to-be-stored container in the first click volume of the stored container at the target streetlet; and
- determining a storing rack for the to-be-stored container from the available rack according to the matching degree between the to-be-stored container and the available rack.

In an optional embodiment, determining the storing rack for the to-be-stored container from the available rack includes:

- determining a matching value between the to-be-stored container and the available rack according to a matching weight and the matching degree between the to-be-stored container and the available rack;
- determining a weighted total cost of storing the to-be-stored container at the available rack according to the matching value between the to-be-stored container and the available rack and a cost term of the available rack; and
- determining the storing rack for the to-be-stored container from the available rack according to the weighted total cost of storing the to-be-stored container at the available rack.

In an optional embodiment, the cost item includes at least one of a handling cost of a container lifter, a level-changing cost, and a commodity distributing cost.

In an optional embodiment, determining the matching degree between the to-be-stored container and the available rack of the target streetlet includes:

- determining a recommended rack level number for the to-be-stored container according to the ranking of the first click volume of the to-be-stored container in the first click volume of the stored container at the target streetlet and a number of containers that can be stored by a rack of the target streetlet;
- determining a recommended rack interval for the to-be-stored container according to the recommended rack level number for the to-be-stored container and a preconfigured confidence parameter; and
- determining the matching degree between the to-be-stored container and the available rack according to the recommended rack interval for the to-be-stored container.

In an optional embodiment, determining the matching degree between the to-be-stored container and the available rack according to the recommended rack interval for the to-be-stored container includes:

- determining the matching degree between the to-be-stored container and the available rack according to a deviation of a level number at which the available rack is located from the recommended rack interval for the to-be-stored container.

In an optional embodiment, the method further includes, before determining the matching degree between the to-be-stored container and the available rack:

- determining the available rack in a rack of the target streetlet.

In an optional embodiment, determining the available rack in the rack of the target streetlet includes:

- determining a first rack to be the available rack in response to determining that a loading rate of the first rack of the target streetlet is less than a target loading rate and the first rack includes an empty buffering location, the empty buffering location being configured to store the to-be-stored container.

In an optional embodiment, determining the ranking of the first click volume of the to-be-stored container in the first click volume of the stored container at the target streetlet includes:

- determining a second click volume of a stock keeping unit in the to-be-stored container and a second click volume of a stock keeping unit in the stored container, the second click volume being configured to characterize a retrieval frequency of the stock keeping unit;

determining the first click volume of the to-be-stored container and the first click volume of the stored container according to the second click volume of the stock keeping unit in the to-be-stored container and the second click volume of the stock keeping unit in the stored container; and determining the ranking of the first click volume of the to-be-stored container in the first click volume of the stored container at the target streetlet according to the first click volume of the to-be-stored container and the first click volume of the stored container.

In an optional embodiment, determining the first click volume of the to-be-stored container and the first click volume of the stored container includes:

determining the first click volume of the to-be-stored container according to a sum of the second click volume of the stock keeping unit in the to-be-stored container; and determining the first click volume of the stored container according to a sum of the second click volume of the stock keeping unit in the stored container.

In an optional embodiment, determining the first click volume of the to-be-stored container and the first click volume of the stored container includes:

determining the first click volume of the to-be-stored container according to a maximum value of the second click volume of the stock keeping unit in the to-be-stored container; and determining the first click volume of the stored container according to a maximum value of the second click volume of the stock keeping unit in the stored container.

In an optional embodiment, determining the second click volume of the stock keeping unit in the to-be-stored container and the second click volume of the stock keeping unit in the stored container includes:

determining the second click volume of the stock keeping unit in the to-be-stored container and the second click volume of the stock keeping unit in the stored container according to an initial click volume of the stock keeping unit and a click volume of the stock keeping unit within a configured time window.

In a second aspect, an embodiment of the present disclosure provides a device for storing a container in a warehouse, including:

a ranking module, configured to determine ranking of a first click volume of a to-be-stored container in a first click volume of a stored container at a target streetlet, the first click volume being configured to characterize a retrieval frequency of a container;

a matching module, configured to determine a matching degree between the to-be-stored container and an available rack of the target streetlet according to the ranking of the first click volume of the to-be-stored container in the first click volume of the stored container at the target streetlet; and a determining module, configured to determine a storing rack for the to-be-stored container from the available rack according to the matching degree between the to-be-stored container and the available rack.

In an optional embodiment, the determining module is specifically configured to: determine a matching value between the to-be-stored container and the available rack according to a matching weight and the matching degree between the to-be-stored container and the available rack; determine a weighted total cost of storing the to-be-stored container at the available rack according to the matching value between the to-be-stored container and the available rack and a cost term of the available rack; and determine the storing rack for the to-be-stored container from the available rack according to the weighted total cost of storing the to-be-stored container at the available rack.

In an optional embodiment, the cost item includes at least one of a handling cost of a container lifter, a level-changing cost, and a commodity distributing cost.

In an optional embodiment, the matching module is specifically configured to: determine a recommended rack level number for the to-be-stored container according to the ranking of the first click volume of the to-be-stored container in the first click volume of the stored container at the target streetlet and a number of containers that can be stored by a rack of the target streetlet; determine a recommended rack interval for the to-be-stored container according to the recommended rack level number for the to-be-stored container and a preconfigured confidence parameter; and determine the matching degree between the to-be-stored container and the available rack according to the recommended rack interval for the to-be-stored container.

In an optional embodiment, the matching module is specifically configured to: determine the matching degree between the to-be-stored container and the available rack according to a deviation of a level number at which the available rack is located from the recommended rack interval for the to-be-stored container.

In an optional embodiment, the device further includes:

a screening module, configured to determine the available rack in a rack of the target streetlet.

In an optional embodiment, the screening module is specifically configured to: determine a first rack to be the available rack in response to determining that a loading rate of the first rack of the target streetlet is less than a target loading rate and the first rack includes an empty buffering location, the empty buffering location being configured to store the to-be-stored container.

In an optional embodiment, the ranking module is specifically configured to: determine a second click volume of a stock keeping unit in the to-be-stored container and a second click volume of a stock keeping unit in the stored container, the second click volume being configured to characterize a retrieval frequency of the stock keeping unit; determine the first click volume of the to-be-stored container and the first click volume of the stored container according to the second click volume of the stock keeping unit in the to-be-stored container and the second click volume of the stock keeping unit in the stored container; and determine the ranking of the first click volume of the to-be-stored container in the first click volume of the stored container at the target streetlet according to the first click volume of the to-be-stored container and the first click volume of the stored container.

In an optional embodiment, the ranking module is specifically configured to: determine the first click volume of the to-be-stored container according to a sum of the second click volume of the stock keeping unit in the to-be-stored container; and determine the first click volume of the stored container according to a sum of the second click volume of the stock keeping unit in the stored container.

In an optional embodiment, the ranking module is specifically configured to: determine the first click volume of the to-be-stored container according to a maximum value of the second click volume of the stock keeping unit in the to-be-stored container; and determine the first click volume of the stored container according to a maximum value of the second click volume of the stock keeping unit in the stored container.

In an optional embodiment, the ranking module is specifically configured to: determine the second click volume of the stock keeping unit in the to-be-stored container and the second click volume of the stock keeping unit in the stored container according to an initial click volume of the stock keeping unit and a click volume of the stock keeping unit within a configured time window.

In a third aspect, the present disclosure provides a computer program product including a computer program that, when being executed by a processor, implements any method in the first aspect.

In a fourth aspect, the present disclosure provides an electronic device, including:

a processor; and a memory, having a computer program stored thereon, wherein the processor is configured to implement any possible method in the first aspect by executing the computer program.

In a fifth aspect, the present disclosure further provides a non-volatile computer-readable storage medium storing a computer instruction, and the non-volatile computer-readable storage medium has computer programs stored thereon that, when being executed by a processor, implement any possible method in the first aspect.

BRIEF DESCRIPTION OF THE DRAWINGS

In order to more clearly illustrate the technical solution in the present disclosure or the related art, the accompanying drawings, which are to be used in the description of the embodiments or the related art, will be briefly described. It will be obvious that the accompanying drawings in the following description are some embodiments of the present disclosure, and that for those skilled in the art, other accompanying drawings can be obtained according to these drawings without creative work.

DETAILED DESCRIPTION

In order to make the purpose, technical solutions and advantages of the embodiments of the present disclosure clearer, the technical solutions in the embodiments of the present disclosure will be described clearly and completely in the following in conjunction with the accompanying drawings in the embodiments of the present disclosure, and it is obvious that the described embodiments are a part of the embodiments of the present disclosure and not all of the embodiments. Based on the embodiments in the present disclosure, all other embodiments obtained by those skilled in the art without making creative work fall within the protection scope of the present disclosure.

With the development of science and technology, the logistics industry is rapidly transforming from traditional logistics to modern logistics. An automated stereoscopic warehouse for storing commodity is an important part of the modern logistics.

Figure 1:
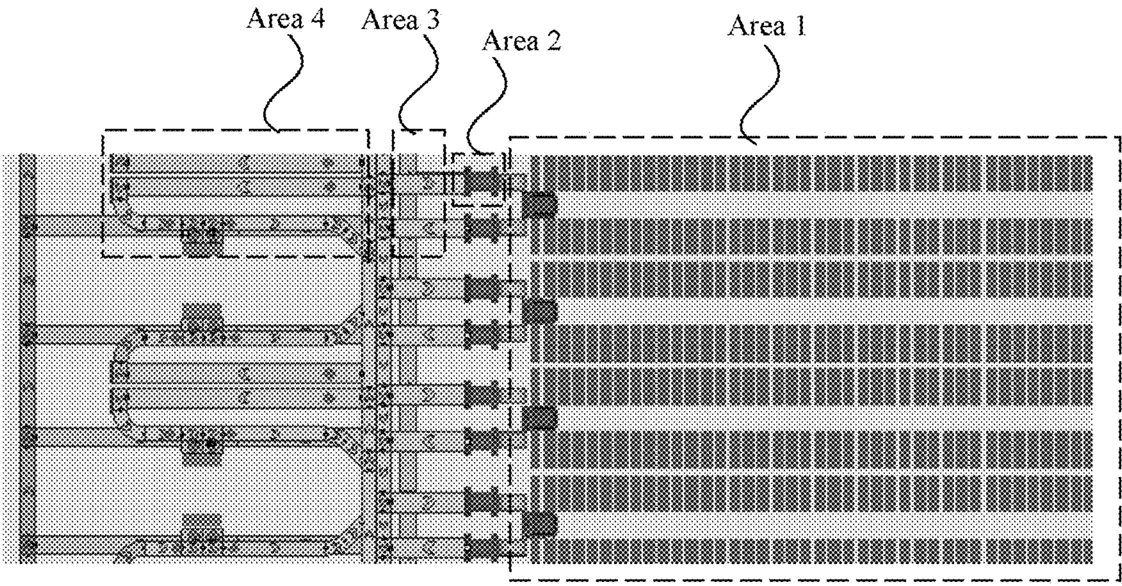
FIG. 1 shows a schematic diagram of an automated stereoscopic warehouse according to an embodiment of the present disclosure.

FIG. 1 is a schematic diagram of an automated stereoscopic warehouse according to an embodiment of the present disclosure.

As shown in FIG. 1, the area 1 of the automated stereoscopic warehouse is a container storage area (which may also be referred to as a stereoscopic rack area). The container storage area includes a plurality of streetlets, each streetlet has a plurality of levels of racks, and each level of rack stores the container. The area 2 of the automated stereoscopic warehouse is provided with a shuttle vehicle, which may move horizontally on the rack of a level of the streetlet to take a to-be-retrieved container from a storage location and carry the same to a retrieval buffering location of the area 3 of the automated stereoscopic warehouse at a streetlet exit on that level. Then a lifer takes the container from the retrieval buffering location and carries the same onto a conveyor line of the area 4 of the automated stereoscopic warehouse, and the conveyor line transmits the container to a picking workstation for retrieval picking and other operations.

In the related art, in the automated stereoscopic warehouse fully equipped with a plurality of shuttle vehicle, each rack level at each streetlet is provided with one shuttle vehicle which is responsible for the retrieval carrying of all the containers on that rack level of the streetlet. In order to reduce the investment cost of equipment, in some automated stereoscopic warehouses, it does not provide each rack level with one shuttle vehicle, but the shuttle vehicle is transmitted/changed between different rack levels through a lifter, so that one shuttle vehicle may carry the containers for storage at a plurality of rack levels.

However, as the shuttle vehicle needs to be continually transmitted/changed between different rack layers, the storage and retrieval efficiency of the automated stereoscopic warehouse is reduced.

In order to solve the above problem, an embodiment of the present disclosure provides a method and device for storing a container in a warehouse to improve the storage and retrieval efficiency of the automated stereoscopic warehouse. In the present disclosure, when there is a to-be-stored container, a rack for storing the to-be-stored container may be determined based on a retrieval frequency of the to-be-stored container, so that containers with a similar retrieval frequency are stored on the same rack. In this way, the frequency of the shuttle transmitting/changing between different racks when transporting the containers can be reduced, thereby improving the retrieval and storage efficiency of the automated stereoscopic warehouse.

It can be understood that the application scenario of the technical solution of the present disclosure may be the automated stereoscopic warehouse in FIG. 1, which however is not limited thereto, and may be applied in other types of stereoscopic warehouses.

It can be understood that the above method for storing a container in a warehouse may be realized by the device for storing a container in a warehouse according to the embodiments of the present disclosure, and the device for storing a container in a warehouse may be part or all of a certain device, for example, a server or a chip of a server.

The technical solution of the embodiments of the present disclosure is described in detail below in specific embodiments, by using a server integrated or installed with relevant execution codes as an example. These following specific embodiments may be combined with each other, and the same or similar concepts or processes may not be repeated in certain embodiments.

Figure 2:
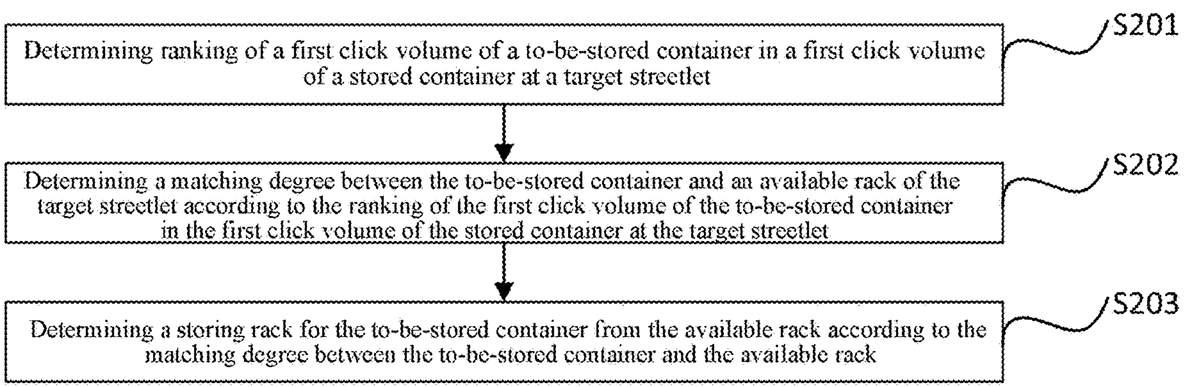
FIG. 2 shows a schematic flow diagram of a method for storing a container in a warehouse according to an embodiment of the present disclosure.

FIG. 2 shows a schematic flow diagram of a method for storing a container in a warehouse according to an embodiment of the present disclosure, which relates to a process of how a server determines a storing rack for a to-be-stored container. As shown in FIG. 2, the method includes operations S201 to S203.

In S201, ranking of a first click volume of a to-be-stored container in a first click volume of a stored container at a target streetlet is determined, the first click volume being configured to characterize a retrieval frequency of a container.

In the present disclosure, when the to-be-stored container has competed the retrieval of a stock keeping unit (SKU) from the warehouse or when a new to-be-stored container is added to the automated stereoscopic warehouse, a storage request for the to-be-stored container may be sent to a server. When the server receives the storage request for the to-be-stored container, it may determine the ranking of the first click volume of the to-be-stored container in the first click volume of the stored container at the target streetlet.

It can be understood that the embodiments of the present disclosure do not limit how the server determines the target streetlet for the to-be-stored container, which may be specifically set according to an actual situation. In some embodiments, different streetlets may store different types of stock keeping units, and the server may determine the target streetlet corresponding to the to-be-stored container by identifying the stock keeping unit stored or to be stored in the to-be-stored container. In some embodiments, the server may calculate the number of containers in different streetlets, and subsequently, use the streetlet with the lower number of containers as the target streetlet for the to-be-stored container.

It can be understood that the embodiments of the present disclosure do not limit how the server determines the ranking of the first click volume of the to-be-stored container in the first click volume of the stored container at the target streetlet. In some embodiments, the server may directly obtain related data of the to-be-stored container and the stored container from a database to determine the ranking of the first click volume of the to-be-stored container in the first click volume of the stored container at the target streetlet.

For example, the server may first determine a second click volume of a stock keeping unit in the to-be-stored container and a second click volume of a stock keeping unit in the stored container, the second click volume being configured to characterize a retrieval frequency of the stock keeping unit. Subsequently, the server may determine the first click volume of the to-be-stored container and the first click volume of the stored container according to the second click volume of the stock keeping unit in the to-be-stored container and the second click volume of the stock keeping unit in the stored container. Finally, the server determines the ranking of the first click volume of the to-be-stored container in the first click volume of the stored container at the target streetlet according to the first click volume of the to-be-stored container and the first click volume of the stored container.

The ranking of the first click volume of the to-be-stored container in the first click volume of the stored container at the target streetlet may be based on a descending order of the first click volume of the to-be-stored container and the first click volume of the stored container, or based on an ascending order of the first click volume of the to-be-stored container and the first click volume of the stored container, which is not limited in the embodiments of the present disclosure.

It is to be noted that the stock keeping unit may be understood as the commodity in the container.

The embodiments of the present disclosure do not limit how the server determines the second click volume, and in some embodiments, the server may determine the second click volume of the stock keeping unit in the to-be-stored container and the second click volume of the stock keeping unit in the stored container according to an initial click volume of the stock keeping unit and a click volume of the stock keeping unit within a configured time window.

It can be understood that the first click volume in an embodiment of the present disclosure may be a retrieval frequency or a number of retrieval times of the container, and the second click volume in an embodiment of the present disclosure may be a retrieval frequency, a number of retrieval times, a number of purchase times or a number of order times of a particular stock keeping unit within the container. For example, when a user selects to purchase a certain commodity and thus an order is generated, the server may arrange for the stock keeping unit corresponding to the commodity to be retrieved from the warehouse, and accordingly, the number of retrieval times of the stock keeping unit may be incremented by 1. Subsequently, the server may count the cumulative number of retrieval times of the stock keeping unit within a certain fixed period of time as the second click volume of the stock keeping unit. At the same time, the server may also calculate the first click volume for one container according to the second click volumes of all the stock keeping units in this container in a fixed period of time.

The embodiments of the present disclosure also do not limit how the first click volume may be determined based on the second click volume. Three ways of determining the first click volume based on the second click volume are provided below.

In a first way, if only one stock keeping unit is kept in the container, the first click volume of the container is equal to the second click of the stock keeping unit in the container.

In a second way, if a plurality of stock keeping units are kept in the container, the server may calculate the sum of the second click volumes of all the stock keeping units in the container as the first click volume of the container.

In a third way, if a plurality of stock keeping units are kept in the container, the server may determine a maximum value among the second click volumes of all the stock keeping units in the container as the first click volume of the container.

In an embodiment of the present disclosure, the first click volume of the to-be-stored container may reflect a selling popularity of the stock keeping unit in the to-be-stored container. The server may store the to-be-stored container in which the stock keeping unit with a good selling popularity is located in a lower-positioned rack, and store the to-be-stored container in which the stock keeping unit with a worse selling popularity is located in a higher-positioned rack, so as to reduce the handling cost of the lifter.

In S202, a matching degree between the to-be-stored container and an available rack of the target streetlet is determined according to the ranking of the first click volume of the to-be-stored container in the first click volume of the stored container at the target streetlet.

In this step, after the server determines the ranking of the first click volume of the to-be-stored container in the first click volume of the stored container at the target streetlet, it may determine the matching degree between the to-be-stored container and the available rack of the target streetlet according to the ranking of the first click volume of the to-be-stored container in the first click volume of the stored container at the target streetlet.

In some embodiments, the server may determine a recommended rack level number for the to-be-stored container according to the ranking of the first click volume of the to-be-stored container in the first click volume of the stored container at the target streetlet and a number of containers that can be stored by a rack of the target streetlet. Then, the server determines a recommended rack interval for the to-be-stored container according to the recommended rack level number for the to-be-stored container and a preconfigured confidence parameter. Finally, the server determines the matching degree between the to-be-stored container and the available rack according to the recommended rack interval for the to-be-stored container The server may specifically determine the matching degree between the to-be-stored container and the available rack according to a deviation of a level number at which the available rack is located from the recommended rack interval for the to-be-stored container.

For example, it is assumed that there are total N levels of racks, which are Rank 1, Rank 2, . . . , Rank N by ranking from the bottom level to the top level, and each rack level can store at most Q containers. At the same time, the to-be-stored container and the stored container are ranked according to the first click volume p in descending order, it is assumed that there are $Q_b$ containers before the to-be-stored container b. Then, for the to-be-stored container b, the recommended rack level number therefor can be $l_{recommend}=[Q_b/Q]$, and accordingly, based on a confidence parameter r thereof, the recommended rack interval of the to-be-stored container b is $l_{min}=\max(1, l_{recommend}-r)$, and $l_{max}=\min(l_{recommend}+r, N)$, where r is a configurable parameter, which can take 0, 1, 2, . . . and so on.

After determining the recommended rack interval for the to-be-stored container b, the matching degree $e_l$ between the to-be-stored container b and the available rack of the $l^{th}$ level can be determined by formula (1):

$$e_l = \begin{cases} (l - l_{max})/N, & l > l_{max} \\ \dfrac{(l_{min} - l)}{N}, & l < l_{min} \\ e_l = 0, & l \in [l_{min}, l_{max}] \end{cases} \tag{1}$$

where the value range of $e_l$ is [0,1], and the smaller $e_l$ is, the better the matching degree between the to-be-stored container b and the available rack of the $l^{th}$ level is.

In S203, a storing rack for the to-be-stored container from the available rack is determined according to the matching degree between the to-be-stored container and the available rack.

In this step, after the server determines the matching degree between the to-be-stored container and the available rack of the target streetlet, the server may determine the storing rack for the to-be-stored container from the available rack according to the matching degree between the to-be-stored container and the available rack.

In some embodiments, the server may directly select the available rack with the best matching degree as the storing rack for the to-be-stored container.

In some other embodiments, the server, in addition to referring to the matching degree between the to-be-stored container and the available rack, may further refer to a cost item of the available rack of each level to comprehensively determine the storing rack for the to-be-stored container.

For example, the server may first determine a matching value between the to-be-stored container and the available rack according to a matching weight and the matching degree between the to-be-stored container and the available rack. Then, the server may determine a weighted total cost of storing the to-be-stored container at the available rack according to the matching value between the to-be-stored container and the available rack and a cost term of the available rack. Finally, the server may determine the storing rack for the to-be-stored container from the available rack according to the weighted total cost of storing the to-be-stored container at the available rack.

The cost item includes at least one of a handling cost of a container lifter, a level-changing cost, and a commodity distributing cost.

For example, if the matching degree between the to-be-stored container b and the available rack of the $l^{th}$ level is $e^l$, the server may calculate a matching value $E_l=\beta_l e_l$ between the to-be-stored container b and the available rack of the $l^{th}$ level, where $\beta_l$ is a matching weight, which may be set according to an actual situation. After determining the matching value $E_l$ between the to-be-stored container b and the available rack of the $l^{th}$ level, the server may consider the matching value $E_l$ together with other cost items (e.g., a level-changing cost $C_l$, a commodity distributing cost $U_l$ and the like), and calculate the weighted total cost S of storing the to-be-stored container b at the available rack of the $l^{th}$ level by means of formula (2):

$$S = E_l + C_l + U_l + \cdots \tag{2}$$

Subsequently, the server may select the available rack with the smallest weighted total cost S as the storing rack for the to-be-stored container b. If there are a plurality of levels with the same weighted total cost, a rack level may be randomly selected therefrom as the storing rack for the to-be-stored container b.

In the method for storing a container in a warehouse in the embodiments of the present disclosure, first, ranking of a first click volume of a to-be-stored container in a first click volume of a stored container at a target streetlet is determined, where the first click volume is configured to characterize a retrieval frequency of a container: then, a matching degree between the to-be-stored container and an available rack of the target streetlet is determined according to the ranking of the first click volume of the to-be-stored container in the first click volume of the stored container at the target streetlet: and finally, a storing rack for the to-be-stored container from the available rack is determined according to the matching degree between the to-be-stored container and the available rack. In comparison with the prior art, in the present disclosure, the containers with a similar retrieval frequency is stored on the same rack level, which reduces the frequency of the shuttle vehicle changing rack level when the shuttle vehicle transports the container, thereby improving the retrieval and storage efficiency of the automated stereoscopic warehouse.

Figure 3:
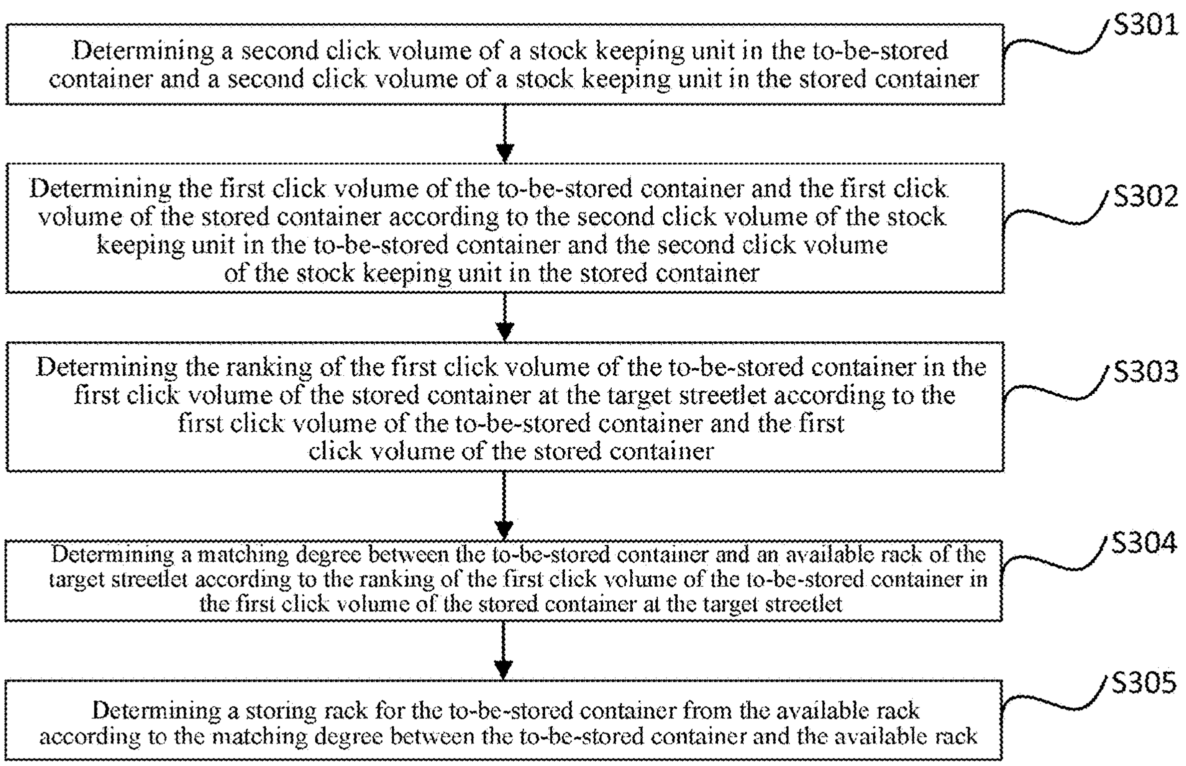
FIG. 3 shows a schematic flow diagram of another for storing a container in a warehouse according to an embodiment of the present disclosure.

On the basis of the above embodiments, it describes below how the server determines the ranking of the first click volume of the to-be-stored container in the first click volume of the stored container at the target streetlet. FIG. 3 shows a flow diagram of another method for storing a container in a warehouse according to an embodiment of the present disclosure. As shown in FIG. 3, the method includes operations S301 to S305.

In S301, a second click volume of a stock keeping unit in the to-be-stored container and a second click volume of a stock keeping unit in the stored container are determined, the second click volume being configured to characterize a retrieval frequency of the stock keeping unit.

In some embodiments, the server may determine the second click volume of the stock keeping unit in the to-be-stored container and the second click volume of the stock keeping unit in the stored container according to an initial click volume of the stock keeping unit and a click volume of the stock keeping unit within a configured time window.

For example, the server may calculate the second click volume of the stock keeping unit in each container respectively. For a new container or a new stock keeping unit, the server may set an initial click volume $Click_{s0}$ for the stock keeping unit $SKU_s$ according to planning data and configure a time window W.

If the stock keeping unit $SKU_s$ is stored for more than W, the second click volume $Click_s$ of the $SKU_s$ may be calculated by using the moving average analysis, and the calculation of $Click_s$ is as the following formula (3).

$$Click_s = \frac{\sum_{i=1}^{W} i \cdot Click_{si}}{\sum_{i=1}^{W} i} \tag{3}$$

If the stock keeping unit $SKU_s$ is stored for less than W, and is stored for W', $Click_{s0}$ may be used to make up the missing days, and the calculation of $Click_s$ is as the following formula (4).

$$Click_s = \frac{\sum_{i=1}^{W-W'} i \cdot Click_{s0} + \sum_{i=W-W'+1}^{W} i \cdot Click_{si}}{\sum_{i=1}^{W} i} \tag{4}$$

In S302, the first click volume of the to-be-stored container and the first click volume of the stored container are determined according to the second click volume of the stock keeping unit in the to-be-stored container and the second click volume of the stock keeping unit in the stored container.

An embodiment of the present disclosure provides two ways of determining the first click volume of the to-be-stored container and the first click volume of the stored container.

In a first way, the server may determine the first click volume of the to-be-stored container according to a sum of the second click volume of the stock keeping unit in the to-be-stored container; and at the same time, determine the first click volume of the stored container according to a sum of the second click volume of the stock keeping unit in the stored container.

For example, if a set of SKUs kept in the container b is $S_b$, the first click volume $p_b$ of the container b may be calculated by formula (5):

$$p_b = \sum_{s \in S_b} Click_s \tag{5}$$

In a second way, the server may determine the first click volume of the to-be-stored container according to a maximum value of the second click volume of the stock keeping unit in the to-be-stored container: and at the same time, determine the first click volume of the stored container according to a maximum value of the second click volume of the stock keeping unit in the stored container.

For example, if a set of SKUs kept in the container b is $S_b$, the first click volume $p_b$ of the container b may be calculated by formula (6):

$$p_b = \max_{s \in S_b} Click_s \tag{6}$$

In S303, the ranking of the first click volume of the to-be-stored container in the first click volume of the stored container at the target streetlet is determined according to the first click volume of the to-be-stored container and the first click volume of the stored container.

It can be understood that the embodiments of the present disclosure do not limit the way in which the first click volume is ranked, and in some embodiments, the server may rank the first click volume of the to-be-stored container and the first click volume of the stored container in a descending order, and in some other embodiments, the server may rank the first click volume of the to-be-stored container and the first click volume of the stored container in an ascending order.

In S304, a matching degree between the to-be-stored container and an available rack of the target streetlet is determined according to the ranking of the first click volume of the to-be-stored container in the first click volume of the stored container at the target streetlet.

In S305, a storing rack for the to-be-stored container from the available rack is determined according to the matching degree between the to-be-stored container and the available rack.

The technical terms, technical effects, technical features, and optional implementations in S304-S305 may be understood with reference to S202-S203 shown in FIG. 2, which will not be repeated here.

Figure 4:
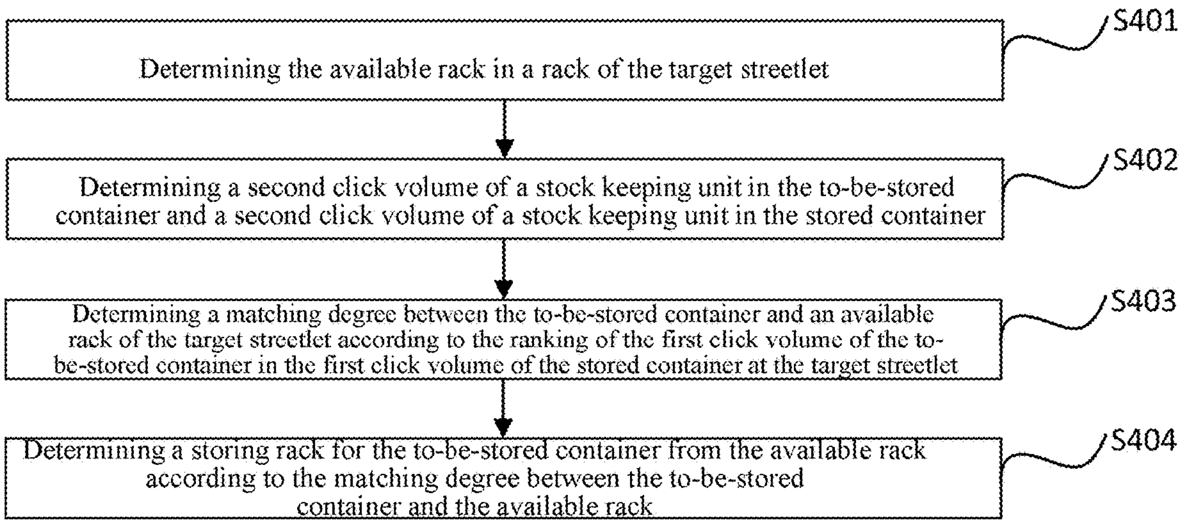
FIG. 4 shows a schematic flow diagram of further another method for storing a container in a warehouse according to an embodiment of the present disclosure.

On the basis of the above embodiments, it describes below how the server determines the available rack at the target streetlet. FIG. 4 shows a flow diagram of yet another method for storing a container in a warehouse according to an embodiment of the present disclosure. As shown in FIG. 4, the method includes operations S401 to S404.

In S401, the available rack is determined in a rack of the target streetlet.

The available rack can be understood as a rack that can store the to-be-stored container.

The embodiments of the present disclosure do not limit how the available rack is determined. In some embodiments, a first rack is determined to be the available rack if a loading rate of the first rack of the target streetlet is less than a target loading rate and the first rack includes an empty buffering location. The empty buffering location is configured to store the to-be-stored container. In some other embodiments, a second rack may also be determined to be the available rack if a loading rate of the second rack of the target streetlet is less than the target loading rate and a shuttle vehicle is present on the second rack.

In S402, ranking of a first click volume of a to-be-stored container in a first click volume of a stored container at a target streetlet is determined, the first click volume being configured to characterize a retrieval frequency of a container.

In S403, a matching degree between the to-be-stored container and an available rack of the target streetlet is determined according to the ranking of the first click volume of the to-be-stored container in the first click volume of the stored container at the target streetlet.

In S404, a storing rack for the to-be-stored container from the available rack is determined according to the matching degree between the to-be-stored container and the available rack.

The technical terms, technical effects, technical features, and optional implementations in S402-S404 may be understood with reference to S201-S203 shown in FIG. 2, which will not be repeated here.

In the method for storing a container in a warehouse in the embodiments of the present disclosure, first, ranking of a first click volume of a to-be-stored container in a first click volume of a stored container at a target streetlet is determined, where the first click volume is configured to characterize a retrieval frequency of a container: then, a matching degree between the to-be-stored container and an available rack of the target streetlet is determined according to the ranking of the first click volume of the to-be-stored container in the first click volume of the stored container at the target streetlet: and finally, a storing rack for the to-be-stored container from the available rack is determined according to the matching degree between the to-be-stored container and the available rack. In comparison with the prior art, in the present disclosure, the containers with a similar retrieval frequency is stored on the same rack level, which reduces the frequency of the shuttle vehicle changing rack level when the shuttle vehicle transports the container, thereby improving the retrieval and storage efficiency of the automated stereoscopic warehouse.

The method for warehousing containers provided by embodiments of the present disclosure first determines a first hit ranking of the containers to be warehoused among the warehoused containers in the target streetlet, the first hit being used to characterise the frequency of warehousing of the containers. Subsequently, a degree of match between the to-be-stored container and the available shelving in the target streetlet is determined based on the first hit ranking of the to-be-stored container among the stored containers in the target streetlet. Finally, based on the degree of match between the to-be-stored containers and the available shelves, an inbound rack for the to-be-stored containers is determined from the available shelves. Compared with the prior art, the present disclosure stores the containers with similar retrieval frequency in the same level of shelves, so as to reduce the frequency of changing levels between different shelves when the shuttle truck is transporting the containers, and thereby improve the efficiency of the access and egress of the automated stereoscopic warehouse.

Those skilled in the art may understand that all or part of the steps for realizing the above method embodiment may be completed by hardware related to program instructions, the foregoing program may be stored in a computer-readable storage medium, the program, when being executed, performs the steps including the above method embodiment, and the foregoing storage medium includes a variety of mediums that can store program codes, such as a ROM, a RAM, a magnetic disc, a compact disc or the like.

Figure 5:
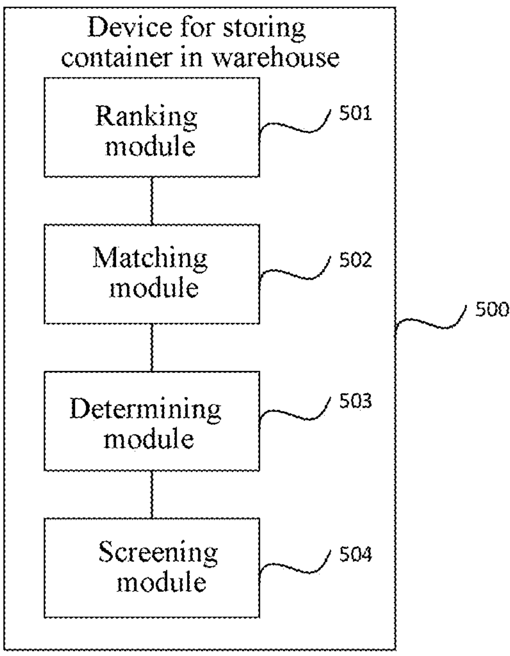
FIG. 5 shows a schematic structure diagram of a device for storing a container in a warehouse according to an embodiment of the present disclosure.

FIG. 5 shows a schematic structure diagram of a device for storing a container in a warehouse according to an embodiment of the present disclosure. The device for storing a container in a warehouse may be implemented by software, hardware, or a combination thereof, and may be, for example, a server or a chip of a server in the above embodiment, to perform the method for storing a container in a warehouse in the above embodiment. As shown in FIG. 5, the device 500 for storing a container in a warehouse includes:

- a ranking module 501, configured to determine ranking of a first click volume of a to-be-stored container in a first click volume of a stored container at a target streetlet, the first click volume being configured to characterize a retrieval frequency of a container;
- a matching module 502, configured to determine a matching degree between the to-be-stored container and an available rack of the target streetlet according to the ranking of the first click volume of the to-be-stored container in the first click volume of the stored container at the target streetlet; and
- a determining module 503, configured to determine a storing rack for the to-be-stored container from the available rack according to the matching degree between the to-be-stored container and the available rack.

In an optional embodiment, the determining module 503 is specifically configured to: determine a matching value between the to-be-stored container and the available rack according to a matching weight and the matching degree between the to-be-stored container and the available rack; determine a weighted total cost of storing the to-be-stored container at the available rack according to the matching value between the to-be-stored container and the available rack and a cost term of the available rack; and determine the storing rack for the to-be-stored container from the available rack according to the weighted total cost of storing the to-be-stored container at the available rack.

In an optional embodiment, the cost item includes at least one of a handling cost of a container lifter, a level-changing cost, and a commodity distributing cost.

In an optional embodiment, the matching module 502 is specifically configured to: determine a recommended rack level number for the to-be-stored container according to the ranking of the first click volume of the to-be-stored container in the first click volume of the stored container at the target streetlet and a number of containers that can be stored by a rack of the target streetlet; determine a recommended rack interval for the to-be-stored container according to the recommended rack level number for the to-be-stored container and a preconfigured confidence parameter; and determine the matching degree between the to-be-stored container and the available rack according to the recommended rack interval for the to-be-stored container.

In an optional embodiment, the matching module 502 is specifically configured to: determine the matching degree between the to-be-stored container and the available rack according to a deviation of a level number at which the available rack is located from the recommended rack interval for the to-be-stored container.

In an optional embodiment, the device further includes:

a screening module 504, configured to determine the available rack in a rack of the target streetlet.

In an optional embodiment, the screening module 504 is specifically configured to: determine a first rack to be the available rack in response to determining that a loading rate of the first rack of the target streetlet is less than a target loading rate and the first rack includes an empty buffering location, the empty buffering location being configured to store the to-be-stored container.

In an optional embodiment, the ranking module 501 is specifically configured to: determine a second click volume of a stock keeping unit in the to-be-stored container and a second click volume of a stock keeping unit in the stored container, the second click volume being configured to characterize a retrieval frequency of the stock keeping unit; determine the first click volume of the to-be-stored container and the first click volume of the stored container according to the second click volume of the stock keeping unit in the to-be-stored container and the second click volume of the stock keeping unit in the stored container; and determine the ranking of the first click volume of the to-be-stored container in the first click volume of the stored container at the target streetlet according to the first click volume of the to-be-stored container and the first click volume of the stored container.

In an optional embodiment, the ranking module 501 is specifically configured to: determine the first click volume of the to-be-stored container according to a sum of the second click volume of the stock keeping unit in the to-be-stored container; and determine the first click volume of the stored container according to a sum of the second click volume of the stock keeping unit in the stored container.

In an optional embodiment, the ranking module 501 is specifically configured to: determine the first click volume of the to-be-stored container according to a maximum value of the second click volume of the stock keeping unit in the to-be-stored container; and determine the first click volume of the stored container according to a maximum value of the second click volume of the stock keeping unit in the stored container.

In an optional embodiment, the ranking module 501 is specifically configured to: determine the second click volume of the stock keeping unit in the to-be-stored container and the second click volume of the stock keeping unit in the stored container according to an initial click volume of the stock keeping unit and a click volume of the stock keeping unit within a configured time window.

It is to be noted that the device for storing a container in a warehouse in the embodiment shown in FIG. 5 may be used to perform the method provided by any of the above embodiments, and the specific implementation and technical effect are similar, which will not be repeated herein.

Figure 6:
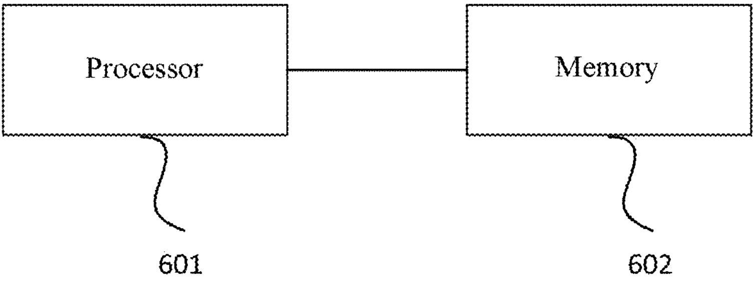
FIG. 6 shows a schematic structure diagram of an electronic device according to an embodiment of the present disclosure.

FIG. 6 shows a schematic structure diagram of an electronic device according to an embodiment of the present disclosure. As shown in FIG. 6, the electronic device may include at least one processor 601 and a memory 602. FIG. 6 illustrates the electronic device with one processor as an example.

The memory 602 is configured to store program. Specifically, the program may include program codes, and the program code includes computer operating instructions.

The memory 602 may include a high-speed RAM memory, or may also include a non-volatile memory such as at least one disk memory.

The processor 601 is configured to execute the computer-executed instructions stored in the memory 602 to implement the method described above.

The processor 601 may be a Central Processing Unit (CPU), or an Application Specific Integrated Circuit (ASIC), or one or more integrated circuits configured to implement the embodiments of the present disclosure.

Optionally, in a specific implementation, if the communication interface, the memory 602, and the processor 601 are implemented independently, they may be connected to each other via a bus to communicate with each other. The bus may be an Industry Standard Architecture (ISA) bus, a Peripheral Component (PCI) bus, or an Extended Industry Standard Architecture (EISA) bus. The bus may be classified into address bus, data bus, control bus or the like, which however does not mean that there is only one bus or one type of bus.

Optionally, in a specific implementation, if the communication interface, the memory 602 and the processor 601 are integrated and implemented on a single chip, they may communicate with each other through an internal interface.

An embodiment of the present application also provides a chip including a processor and an interface. The interface is configured to input and output data or instructions processed by the processor. The processor is configured to execute the method provided in the above method embodiment. The chip can be used in the device for storing a container in a warehouse.

The present disclosure also provides a computer-readable storage medium, which may include: a USB flash drive, a removable hard disk, a read-only memory (ROM), a random access memory (RAM), a magnetic disk, or a compact disc, and other kinds of media that can store program codes, and specifically, the computer readable storage medium has program information stored thereon, and the program information is used in the method for storing a container in a warehouse.

An embodiment of the present disclosure also provides a program which, when being executed by a processor, is used to execute the method for storing a container in a warehouse provided by the above method embodiments.

An embodiment of the present disclosure also provides a program product, such as a computer-readable storage medium, which has instructions stored thereon which, when run on a computer, cause the computer to execute the method for storing a container in a warehouse provided by the above method embodiments.

The above embodiments may be implemented in whole or in part by software, hardware, firmware, or any combination thereof. When being implemented by software, the above embodiments may be implemented in whole or in part in the form of a computer program product. The computer program product includes one or more computer programs. When the computer program is loaded and executed on a computer, the process or function according to the embodiments of the present disclosure is generated in whole or in part. The computer may be a general-purpose computer, a special purpose computer, a computer network, or other programmable device. The computer program may be stored in a computer-readable storage medium or transmitted from one computer-readable storage medium to another computer-readable storage medium, e.g., the computer program may be transmitted from a web site, computer, server or data center to another web site, computer, server or data center via wired (e.g., coaxial cable, optical fiber, digital subscriber line (DSL)) or wireless (e.g., infrared, wireless, microwave, etc.) way. The computer-readable storage medium may be any usable medium which a computer can access or a data storage device such as a server, data center including one or more usable media integrated. The usable medium may be a magnetic medium (e.g., floppy disk, hard disk, tape), an optical medium (e.g., DVD), a semiconductor medium (e.g., a solid state disk (SSD)), or the like.

Finally, it is to be noted that the above embodiments are only used to illustrate the technical solution of the present disclosure without limiting the same. Although the present disclosure has been described in detail with reference to the foregoing embodiments, those skilled in the art should understand that it may make modifications to the technical solution recited in the foregoing embodiments or make equivalent substitutions for some or all of the technical features therein, and such modifications or substitutions do not make the nature of the corresponding technical solutions go beyond the scope of the technical solutions of the embodiments of the present disclosure.

What is claimed is:

1. A method for storing a container in a warehouse, comprising:

determining a ranking of a first click volume of a to-be-stored container and a first click volume of a stored container at a target streetlet, the first click volume being configured to characterize a retrieval frequency of a container;

determining a matching degree between the to-be-stored container and an available rack level of the target streetlet according to the ranking of the first click volume of the to-be-stored container and the first click volume of the stored container at the target streetlet; and determining a storing rack level for the to-be-stored container from available rack levels according to matching degrees between the to-be-stored container and the available rack levels, wherein determining the matching degree between the to-be-stored container and the available rack level of the target streetlet comprises:

determining a recommended rack level number for the to-be-stored container according to the ranking of the first click volume of the to-be-stored container and the first click volume of the stored container at the target streetlet and a number of containers that can be stored by a rack level of the target streetlet;

determining a recommended range of rack level number for the to-be-stored container according to the recommended rack level number for the to-be-stored container and a preconfigured confidence parameter; and determining the matching degree between the to-be-stored container and the available rack level according to the recommended range of rack level number for the to-be-stored container.

2. The method according to claim 1, wherein determining the storing rack level for the to-be-stored container from the available rack levels comprises:

determining a matching value between the to-be-stored container and the available rack level according to a matching weight and the matching degree between the to-be-stored container and the available rack level, wherein the matching weight is a ratio of the matching value to the matching degree and is preset;

determining a weighted total cost of storing the to-be-stored container at the available rack level according to the matching value between the to-be-stored container and the available rack level and a cost item of the available rack level; and determining the storing rack level for the to-be-stored container from the available rack levels according to weighted total costs of storing the to-be-stored container at the available rack levels.

3. The method according to claim 2, wherein the cost item comprises at least one of a handling cost of a container lifter, a level-changing cost, and a commodity distributing cost.

4. The method according to claim 1, wherein determining the matching degree between the to-be-stored container and the available rack level according to the recommended range of rack level number for the to-be-stored container comprises:

determining the matching degree between the to-be-stored container and the available rack level according to a deviation of a level number at which the available rack level is located from the recommended range of rack level number for the to-be-stored container.

5. The method according to claim 1, further comprising, before determining the matching degree between the to-be-stored container and the available rack level:

determining the available rack level in rack levels of the target streetlet.

6. The method according to claim 5, wherein determining the available rack level in the rack levels of the target streetlet comprises:

determining a first rack level to be the available rack level in response to determining that a loading rate of the first rack level of the target streetlet is less than a target loading rate and the first rack level comprises an empty buffering location, the empty buffering location being configured to store the to-be-stored container.

7. The method according to claim 1, wherein determining the ranking of the first click volume of the to-be-stored container and the first click volume of the stored container at the target streetlet comprises:

determining a second click volume of a stock keeping unit in the to-be-stored container and a second click volume of a stock keeping unit in the stored container, the second click volume being configured to characterize a retrieval frequency of the stock keeping unit;

determining the first click volume of the to-be-stored container and the first click volume of the stored container according to the second click volume of the stock keeping unit in the to-be-stored container and the second click volume of the stock keeping unit in the stored container; and determining the ranking of the first click volume of the to-be-stored container and the first click volume of the stored container at the target streetlet according to the first click volume of the to-be-stored container and the first click volume of the stored container.

8. The method according to claim 7, wherein determining the first click volume of the to-be-stored container and the first click volume of the stored container comprises:

determining the first click volume of the to-be-stored container according to a sum of the second click volume of the stock keeping unit in the to-be-stored container; and determining the first click volume of the stored container according to a sum of the second click volume of the stock keeping unit in the stored container.

9. The method according to claim 7, wherein determining the first click volume of the to-be-stored container and the first click volume of the stored container comprises:

determining the first click volume of the to-be-stored container according to a maximum value of the second click volume of the stock keeping unit in the to-be-stored container; and determining the first click volume of the stored container according to a maximum value of the second click volume of the stock keeping unit in the stored container.

10. The method according to claim 7, wherein determining the second click volume of the stock keeping unit in the to-be-stored container and the second click volume of the stock keeping unit in the stored container comprises:

determining the second click volume of the stock keeping unit in the to-be-stored container and the second click volume of the stock keeping unit in the stored container according to an initial click volume of the stock keeping unit and a click volume of the stock keeping unit within a configured time window.

11. A device for storing a container in a warehouse, comprising:

a processor; and a memory, having stored thereon instructions that, when being executed by the processor, causes the processor to perform acts comprising:

determining a ranking of a first click volume of a to-be-stored container and a first click volume of a stored container at a target streetlet, the first click volume being configured to characterize a retrieval frequency of a container;

determining a matching degree between the to-be-stored container and an available rack level of the target streetlet according to the ranking of the first click volume of the to-be-stored container and the first click volume of the stored container at the target streetlet; and determining a storing rack level for the to-be-stored container from available rack levels according to matching degrees between the to-be-stored container and the available rack levels, wherein determining the matching degree between the to-be-stored container and the available rack level of the target streetlet comprises:

determining a recommended rack level number for the to-be-stored container according to the ranking of the first click volume of the to-be-stored container and the first click volume of the stored container at the target streetlet and a number of containers that can be stored by a rack level of the target streetlet;

determining a recommended range of rack level number for the to-be-stored container according to the recommended rack level number for the to-be-stored container and a preconfigured confidence parameter; and determining the matching degree between the to-be-stored container and the available rack level according to the recommended range of rack level number for the to-be-stored container.

12. The device according to claim 11, wherein determining the storing rack level for the to-be-stored container from the available rack levels comprises:

determining a matching value between the to-be-stored container and the available rack level according to a matching weight and the matching degree between the to-be-stored container and the available rack level, wherein the matching weight is a ratio of the matching value to the matching degree and is preset;

determining a weighted total cost of storing the to-be-stored container at the available rack level according to the matching value between the to-be-stored container and the available rack level and a cost item of the available rack level; and determining the storing rack level for the to-be-stored container from the available rack levels according to weighted total costs of storing the to-be-stored container at the available rack levels.

13. The device according to claim 11, wherein determining the matching degree between the to-be-stored container and the available rack level according to the recommended range of rack level number for the to-be-stored container comprises:

determining the matching degree between the to-be-stored container and the available rack level according to a deviation of a level number at which the available rack level is located from the recommended range of rack level number for the to-be-stored container.

14. The device according to claim 11, wherein the acts further comprise, before determining the matching degree between the to-be-stored container and the available rack level:

determining the available rack level in rack levels of the target streetlet, and wherein determining the available rack level in the rack levels of the target streetlet comprises:

determining a first rack level to be the available rack level in response to determining that a loading rate of the first rack level of the target streetlet is less than a target loading rate and the first rack level comprises an empty buffering location, the empty buffering location being configured to store the to-be-stored container.

15. The device according to claim 11, wherein determining the ranking of the first click volume of the to-be-stored container and the first click volume of the stored container at the target streetlet comprises:

determining a second click volume of a stock keeping unit in the to-be-stored container and a second click volume of a stock keeping unit in the stored container, the second click volume being configured to characterize a retrieval frequency of the stock keeping unit;

determining the first click volume of the to-be-stored container and the first click volume of the stored container according to the second click volume of the stock keeping unit in the to-be-stored container and the second click volume of the stock keeping unit in the stored container; and determining the ranking of the first click volume of the to-be-stored container in the first click volume of the stored container at the target streetlet according to the first click volume of the to-be-stored container and the first click volume of the stored container.

16. The device according to claim 15, wherein determining the first click volume of the to-be-stored container and the first click volume of the stored container comprises at least one of:

determining the first click volume of the to-be-stored container according to a sum of the second click volume of the stock keeping unit in the to-be-stored container, and determining the first click volume of the stored container according to a sum of the second click volume of the stock keeping unit in the stored container; or determining the first click volume of the to-be-stored container according to a maximum value of the second click volume of the stock keeping unit in the to-be-stored container and determining the first click volume of the stored container according to a maximum value of the second click volume of the stock keeping unit in the stored container.

17. The device according to claim 15, wherein determining the second click volume of the stock keeping unit in the to-be-stored container and the second click volume of the stock keeping unit in the stored container comprises:

determining the second click volume of the stock keeping unit in the to-be-stored container and the second click volume of the stock keeping unit in the stored container according to an initial click volume of the stock keeping unit and a click volume of the stock keeping unit within a configured time window.

18. A non-transitory computer readable storage medium having stored thereon instructions that, when being executed by a processor, causes the processor to perform acts comprising:

determining a ranking of a first click volume of a to-be-stored container and a first click volume of a stored container at a target streetlet, the first click volume being configured to characterize a retrieval frequency of a container;

determining a matching degree between the to-be-stored container and an available rack level of the target streetlet according to the ranking of the first click volume of the to-be-stored container and the first click volume of the stored container at the target streetlet; and determining a storing rack level for the to-be-stored container from available rack levels according to matching degrees between the to-be-stored container and the available rack levels, wherein determining the matching degree between the to-be-stored container and the available rack level of the target streetlet comprises:

determining a recommended rack level number for the to-be-stored container according to the ranking of the first click volume of the to-be-stored container and the first click volume of the stored container at the target streetlet and a number of containers that can be stored by a rack level of the target streetlet;

determining a recommended range of rack level number for the to-be-stored container according to the recommended rack level number for the to-be-stored container and a preconfigured confidence parameter; and determining the matching degree between the to-be-stored container and the available rack level according to the recommended range of rack level number for the to-be-stored container.

* * * * *